United States Patent [19]
Miller

[11] Patent Number: 5,280,697
[45] Date of Patent: Jan. 25, 1994

[54] MANUAL FRUIT PICKER

[76] Inventor: Mark Miller, 12216 NE. 37th St., Vancouver, Wash. 98682

[21] Appl. No.: 738,171

[22] Filed: Jul. 30, 1991

[51] Int. Cl.$^5$ .................. A01D 46/00; A01D 46/22
[52] U.S. Cl. ...................... 56/329; 56/332; 56/338; 56/331
[58] Field of Search ............ 56/329, 330, 331, 332, 56/337, 338

[56]         References Cited
U.S. PATENT DOCUMENTS

| | | | |
|---|---|---|---|
| 225,610 | 3/1880 | Jarman. | |
| 397,334 | 2/1889 | Brooks | 56/337 |
| 681,203 | 8/1901 | Eddy | 56/337 |
| 964,108 | 7/1910 | Johnson | 56/340 |
| 1,214,450 | 1/1917 | Gifford | 56/3 |
| 1,600,566 | 9/1926 | Ricketts | 56/331 |
| 2,406,055 | 8/1946 | Barber | 56/340 |
| 2,508,805 | 5/1950 | Scott | 56/338 |
| 3,664,104 | 5/1972 | Jamshidi | 56/332 |
| 4,226,075 | 10/1980 | Adams | 56/337 |
| 4,388,798 | 6/1983 | Gerber | 56/332 X |
| 4,833,870 | 5/1989 | Middleton | 56/340 |

Primary Examiner—Stephen J. Novosad
Attorney, Agent, or Firm—Klarquist, Sparkman, Campbell, Leigh & Whinston

[57] ABSTRACT

The fruit picker separates a fruit, positioned within an intake end opening of a hollow tube, from its stem by extending a blade across the opening. With the stem forced against the wall of the opening, the tube is moved to separate the stem from the fruit. The movement causes the fruit to fall by gravity inside the tube through a discharge end to which a collection bottle is connected.

11 Claims, 2 Drawing Sheets

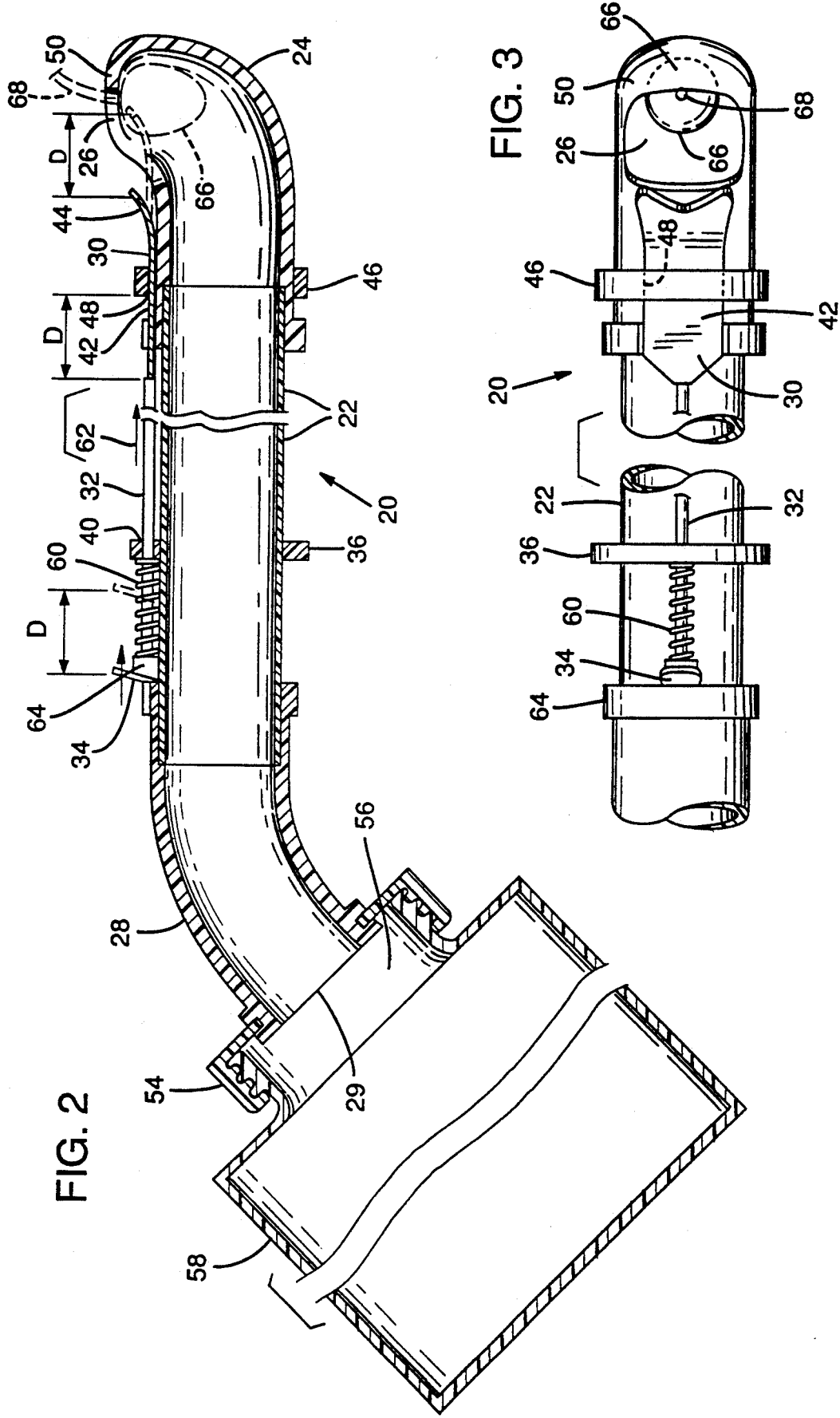

MANUAL FRUIT PICKER

TECHNICAL FIELD

This invention relates to an apparatus for facilitating picking fruit by hand.

BACKGROUND INFORMATION

Fruits and in particular, berries, are often picked from trees and bushes by hand. There are several drawbacks of picking berries by hand: Firstly, the method is relatively slow and uneconomical. Secondly, some bushes may be so large that a person cannot reach all of the berries located inside or at the top of the bushes. Thirdly, some bushes have thorns which may scratch or injure the hands of the person picking the berries.

There is a need for and it would be desirable to have a light-weight berry picker for quickly and easily removing berries from bushes without bruising or crushing the berries and without scratching the hands of the persons picking the berries. Additionally, there is a need for and it would be desirable to have a berry picker to enable a person to pick berries which cannot be reached by hand and to have the removed berries collected in a storage container with minimal spillage and damage to the berries. These are the primary objectives of the present invention.

SUMMARY OF THE INVENTION

The invention is directed to a light-weight manually operated fruit picker for removing fruits and in particular, berries, from bushes. The picker includes a long tube open at both ends. One end is upturned to provide an intake opening for receiving a fruit to be picked. The opposite discharge end is coupled to a collection container. A blade-like removal means at the intake end when actuated moves across the intake opening to pin the stem of the fruit within the opening against the wall of such opening, severing the fruit from the stem when thereafter the intake end is moved. A rod-like actuator, operated manually from near the discharge end of the tube, actuates the removal blade. The severed fruit rolls from the intake end through the tube and discharge end into the collection container.

The primary objective is to increase the speed of the manual berry picking process.

Another objective of this invention is to construct a berry picker that is long enough to substantially increase the reach and to reduce the risk of scratching the hands of the person picking the berries.

Another objective of this invention is to provide a berry picker which separates the berry from its stem at the intake end and allows it to roll inside the tube through the discharge end into a collection bottle to minimize spillage and damage to the berries.

The foregoing and other objects, features and advantages of the invention will become apparent for the following description of what is presently a preferred embodiment.

BRIEF DESCRIPTION OF THE DRAWINGS

FIG. 2 is a foreshortened longitudinal sectional side view of the berry picker of FIG. 1.

FIG. 3 is a foreshortened top view of the berry picker of FIG. 1 showing an intake end and an actuator.

DETAILED DESCRIPTION OF A PREFERRED EMBODIMENT

Figure 1:
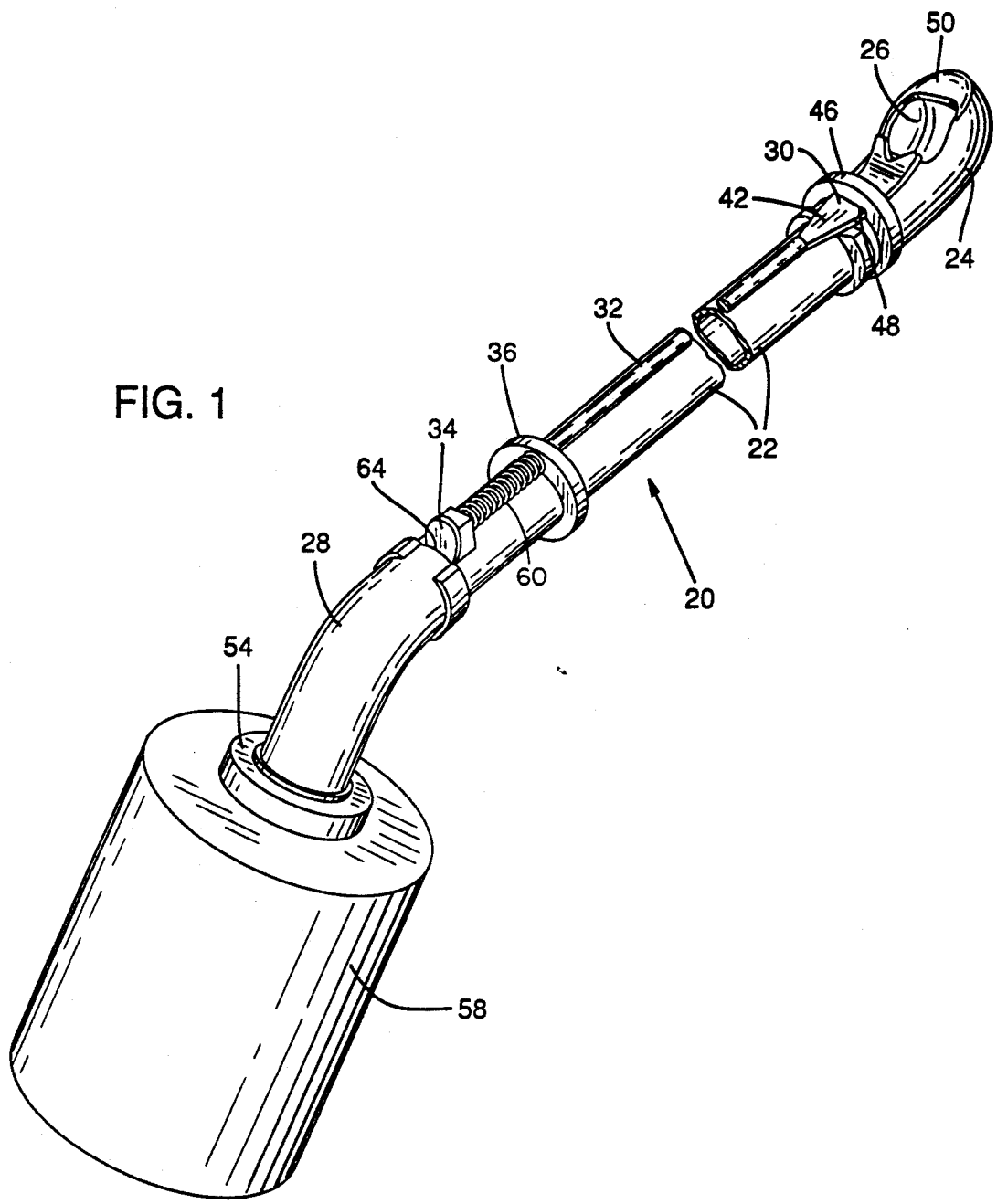
FIG. 1 is a perspective view of a berry picker constructed in accordance with the present invention.

With reference to FIGS. 1-3, a berry picker 20 of the present invention comprises an elongated hollow tube 22 that is typically about 2 to 3 feet long and about one inch in diameter and therefore suitable for picking blackberries, raspberries, strawberries and the like. Tube 22 has an upturned open intake end 24 defining an upwardly directed intake opening 26, and an opposite open discharge end 28 having a downwardly directed discharge opening 29. Intake opening 26 is about one inch in diameter. However, diameters up to several inches are contemplated depending on the size of the fruit to be picked. A removal means comprising a blade 30 at intake end 24 is coaxially connected to one end of a cylindrical actuator rod 32. Rod 32 extends almost the full length of the straight portion of tube 22. The opposite end of rod 32 terminates at a disc-shaped thumb-actuated actuator plate 34. In this way, actuator plate 34 is mechanically linked to blade 30 by actuator rod 32. Rod 32 is slidably mounted to tube 22 by a holder 36. Holder 36 defines a passage 40 permitting rod 32 to slidably move in a longitudinal direction parallel to the axis of tube 22.

Blade 30 includes a generally flat portion 42, as shown in FIG. 2, terminating in an upwardly curved and forked shearing edge 44. It is contemplated to sharpen edge 44 depending on the fruit to be picked. Blade 30 is slidably secured to tube 22 by ring-shaped holder 46 near intake opening 26. The inner diameter of ring 46 is dimensioned for receiving tube 22 and for allowing flat portion 42 of blade 30 to slide longitudinally through slot 48 formed between ring 46 and a portion of the outer surface of tube 22. However, slot 48 is small enough to prevent the cylindrical-shaped actuator rod 32 from sliding through. In this way, blade 30 can only move a distance D into intake opening 26, as shown in FIG. 2. This limitation of movement of blade 30 prevents cutting edge 44 of blade 30 from abutting the inner surface of intake opening 26 below a flange 50 extending inwardly toward intake opening 26.

Alternatively, instead of using rings 36 and 46, the rod could slide within a small guiding tube attached to tube 22. The guiding would extend along the tube 22 to protect rod 32.

Discharge end 28 of tube 22 is connected to a screw-on cap 54. Discharge end 28 forms a angle that is between 0° and 90° relative to the longitudinal axis of tube 22. A 45° angle is preferred. The angular position of discharge end 28 is angled in a direction opposite the angular direction of the upturned intake end 24. Cap 54 is threaded to an opening 56 defined by a berry collection bottle 58.

A spring 60 is positioned between actuator plate 34 and holder 36 for urging blade 30 away from intake opening 26 when actuator plate 34 is disengaged (that is, urging blade 30 to the left in FIG. 2). Movement of actuator plate 34 towards intake end 24, against the compression of spring 60, causes blade 30 to extend over intake opening 26. The compression of spring 60 is such that a person can, with little effort, push actuator 34 plate against the compression of spring 60. On the other hand, the compression of spring 60 is sufficiently strong to urge actuator plate 34 against a stop surface 64 when actuator plate 34 is disengaged. Stop surface 64, attached to tube 22 near discharge end 28, is substantially perpendicular to the longitudinal axis of tube 22.

In use, intake opening 26 of tube 22 is positioned to surround a berry 66. Blade 30 is actuated by manually urging actuator 34 against the tension of spring 60, as indicated by an arrow 62 shown in FIG. 2. This causes blade 30 to extend across intake opening 26 to push a stem 68, supporting berry 66, against flange 50. Edge 44 of blade 30 is forked to prevent stem 68 from sliding off edge 44. With stem 68 forced against flange 50, intake end 24 of tube 22 is moved slightly downward to separate berry 66 from stem 68, causing berry 66 to drop into tube 22. By raising intake end 24 of tube 22, berry 66 drops by gravity inside the hollow tube 22 and through discharge openings 29 into collection bottle 58 connected discharge end 28.

While the present invention has been described in accordance with preferred embodiments, it is to be understood that certain substitutions and alterations may be made thereto without departing from the spirit and scope of the appended claims.

I claim:

1. A fruit picker comprising:
    an elongated tubular member having an upturned open intake end defining an intake opening and an opposite open discharge end;
    removal means at the intake end and cooperative with the intake end opening for separating a fruit within the opening from its stem;
    an actuator manually operable from near the discharge end for actuating the removal means from a retracted position adjacent the intake opening to an operating position overlying the intake opening; and
    collecting means connected to the discharge end for collecting the fruit received by the intake end and passed by gravity through the tubular member and discharge end;
    wherein the tubular member has an angular discharge end portion terminating at the discharge end.

2. The fruit picker of claim 1, wherein the axis of the angular portion is at an angle of between about 10° and 90° to the axis of the principal length of the tubular member.

3. The fruit picker of claim 1, wherein the angular portion is angled in a direction opposite the angular direction of the upturned intake end.

4. The fruit picker of claim 1, wherein the actuator comprises a mechanical linkage extending along the tubular member and connected at one end to the removal means and at the opposite end to a manually operable actuator element.

5. The fruit picker of claim 1, wherein the linkage comprises a rod.

6. The fruit picker of claim 4, wherein the linkage is spring-biased to urge the removal means to its retracted position.

7. The fruit picker of claim 1, wherein the fruit picker is dimensioned for picking berries.

8. A fruit picker comprising:
    an elongated tubular member having an upturned open intake end defining an intake opening and an opposite open discharge end;
    removal means at the intake end and cooperative with the intake end opening for separating a fruit within the opening from its stem;
    an actuator manually operable from near the discharge end for actuating the removal means from a retracted position adjacent the intake opening to an operating position overlying the intake opening; and
    collecting means connected to the discharge end for collecting the fruit received by the intake end and passed by gravity through the tubular member and discharge end;
    wherein the intake end includes a flange extending inwardly towards the intake end opening.

9. A fruit picker comprising:
    an elongated tubular member having an upturned open intake end defining an intake opening and an opposite open discharge end;
    removal means at the intake end and cooperative with the intake end opening for separating a fruit within the opening from its stem;
    an actuator manually operable from near the discharge end for actuating the removal means from a retracted position adjacent the intake opening to an operating position overlying the intake opening; and
    collecting means connected to the discharge end for collecting the fruit received by the intake end and passed by gravity through the tubular member and discharge end;
    wherein the removal means includes a blade having a flat portion onto which an upturned cutting edge is attached.

10. The fruit picker of claim 9, wherein the cutting edge is sharpened.

11. The fruit picker of claim 9, wherein the cutting edge is forked.

* * * * *